ized form in either the operative or inoperative position.

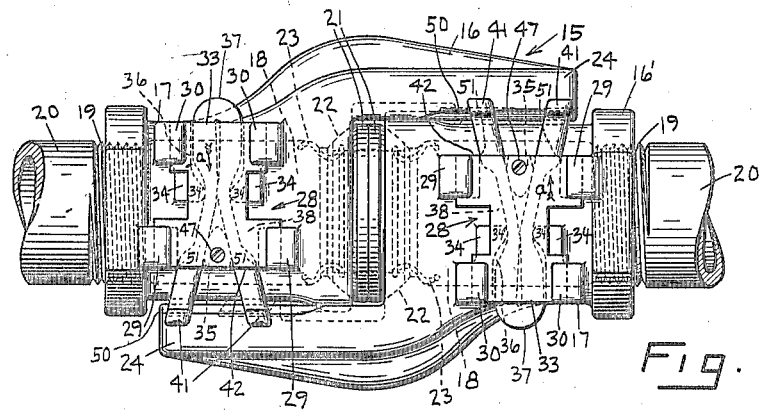

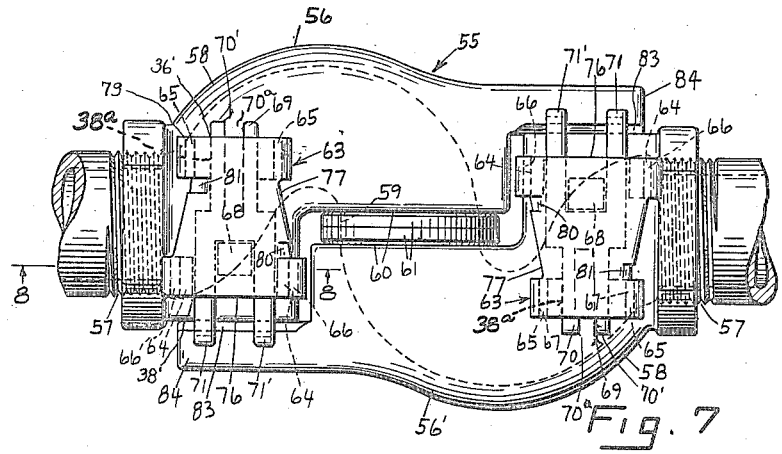

UNITED STATES PATENT OFFICE 2,039,058

COUPLER AND LOCK

George T. Cooke, South Norwalk, Conn., assignor to American Railway Products Company, Inc., South Norwalk, Conn., a corporation of New York Application July 7, 1934, Serial No. 734,131

26 Claims. (Cl. 285—66)

This invention relates to couplings, of the type most generally used with hose and pipe, and especially to couplings for use with railway passenger coaches and freight cars to supply steam, vapor, and/or air from the engine thereto or from one to the other.

Heretofore there have been a number of proposals for locking the mating parts of a coupler, one relative to the other. Most of these proposals had the disadvantage of not being very practical for day-in and day-out use over a long period of time, and in all kinds of weather conditions, to which articles of this type are subject. For example, some of these included coil springs for moving a plunger from one to another of the coupling parts in order to effect the locked condition and these coil springs became rusted in sockets and therefore rendered the device inoperative, by making it extremely hard to disconnect the lock and by leading to the belief that the plunger was fully in locked position when the rusted spring prevented or retarded movement of the plunger toward the locking position. Other proposals included the provision of a swinging gate which, however, had the disadvantage of swinging loose with the vibrations that occur in the type of equipment with which these couplings are ordinarily used. In some of the other proposals a very critical alignment of the mating parts was necessary in order to render the lock effective, and some required special care to retract the locking members before the main coupling heads could be put together.

It is an object of the present invention to provide a simple and inexpensive coupler lock which will be positive and effective for continuous use over a long period of time and through all kinds of conditions.

It is another object of the present invention to provide a lock which will not require any critical alignment between the coupling parts before it can be moved into locking position, and which can be easily and quickly moved from the locking or operative position into an inoperative position.

It is a further object of the present invention to provide a coupling which will be as nearly leakproof as possible.

A still further object of the present invention is to provide a coupling which may be thoroughly locked in the final connected position, and which will remain locked during the many vibrations and the swinging movements of the devices with which it may be used.

Some of the other objects of the present invention are to: provide a coupler in which the various parts may be easily and quickly replaced when worn; provide a more efficient coupler lock which may be used to replace different type locks already in use without replacing the entire coupler; and to provide an improved coupler including a very efficient lock which will cooperate and work satisfactorily with the coupler heads having another type of lock now in general use.

Although, in its present preferred embodiment the present invention is illustrated and described in connection with couplings, the lock thereof may be used equally well and substantially without change on other devices.

The present invention provides a number of novel features relating to improved couplers and to locking mediums therefor, including: a novel housing which is comparatively open in order to prevent the accumulation of moisture with its attendant rust; several novel covers for the housing, either to permit ready removal of the housing and/or the enclosed parts, or to be permanently locked relative to the housing; and a novel channel for a locking member adapted to locate, direct, and hold the member in its travel toward and from both its operative and inoperative positions.

A number of additional features are provided by the present invention including: unusual types of locking members which in one form is expansible to grip a small number of parts and thereby be held in retracted position, and which grips a larger number of parts in the advanced position to more firmly remain in this important position; which has the advantage of providing a plurality of wedge locking points on the sides of the member and at the point where it performs its main holding function; which, through an inherent resilient characteristic dispenses with the necessity of usual coil spring and coil spring sockets that accumulate water and rust; and which has novel, integral structures adapted to limit its travel into both operative and inoperative positions. In another form the locking member is expansible to frictionally remain in both advanced and retracted position.

An individual feature of the present invention is the provision of a coupler with a cotter lock, in which the cotter is automatically opened or spread as it is driven into the operative position.

Another feature is the provision of a coupler lock medium which may be readily disassembled in order to replace worn parts, and which may be easily and quickly assembled to the general or main coupling parts of couplers already in the field.

A further individual feature of the present invention is the provision of a novel lock adapted to wedge upon and rotate mating coupling heads, one relative to the other in order to move them fully into closed position about a regular connection, and which has the novel advantage of each providing a double locking contact to minimize the vibration and to minimize the danger of moving the member into a retracted position.

In the drawings Figure 1 is a top plan view of the complete coupler with the present invention applied thereto.

Fig. 2 is a side view of the complete coupler in the closed and locked position, with the open position shown by dot and dash lines.

Fig. 3 is a top view of just one coupling head with the locking device of the present invention in the retracted position.

Fig. 4 is an end view of the coupling with a fragmentary sectional showing of the locking devices of the present invention in operative position.

Fig. 5 is a perspective view of the locking member.

Fig. 6 is a perspective view of one form of cover plate provided by the present invention.

Fig. 7 is a top plan view of a modified form of the present invention.

Fig. 8 is a fragmentary sectional view taken on line 8—8 in Fig. 7.

Fig. 9 is a perspective view of the modified form of locking member.

Fig. 10 is a perspective view of the cover plate illustrated with that form of the invention shown in Fig. 7.

Fig. 11 is a perspective detail of a modified form of locking unit.

The present preferred embodiment of this invention illustrated in Figs. 1 through 6 comprises a coupling 15 including counter-part coupling heads 16 and 16' each having a main body section 17 with an integral bore 18 having a screw thread connection 19 at one end for receiving a pipe 20, while the opposite end of the bore is provided with a gasket 21 held against a chamfered wall 22 by spring clips 23. Although a thread connection 19 in a solid pipe 20 is shown, it should be understood that any other conventional connection may be used, and that hose, flexible metal conduit, and the like may be used.

Each of the heads is provided with a connecting arm 24 projecting longitudinally beyond the face of one gasket 21 so that these arms will be immediately adjacent the main body position 17 of each of the heads in order to align the two, and each of these arms is provided with an eccentric connecting hook 25 having an overhanging flange 26 adapted to engage and cooperate with connecting lugs 27 on the sides of the main body 17 in such manner that there is a small space between the gaskets 21 when the two heads are pivotally separated as indicated by dot and dash lines in Fig. 2 and move the heads longitudinally toward each other to insure a substantially tight connection between the two gaskets as the heads are moved relative to each other from said dot and dash position shown in Fig. 2 into the fully connected position shown by solid lines.

In the general uses of couplings, especially on railways, it has been found extremely desirable to provide means to lock mating coupling heads together in order to prevent them from becoming disconnected, or from becoming loosened relative to each other sufficiently to adversely permit the escape of steam, vapor, air, or the like. This is very important, since the escaping steam, or the like between passenger cars annoys and sometimes scares people getting into and out of the cars, and lowers the efficiency of the engine in its main duty of pulling, as well as rendering the individual car devices to which they are associated less effective.

Because the couplings are between passenger cars in close places there is danger of steam moisture settling on the platform or steps and freezing with many attendant dangers. In this close place between cars the trainman may be burned by steam if the joint is not tight, or if he must pull back locking members or otherwise manipulate the coupling heads. These dangers are overcome advantageously by the safer coupling provided by the present invention, since the locking members are yieldingly held in retracted and advanced position and tighten the main connection between coupling heads.

Now, it should be particularly noted, that the present invention provides a novel and highly efficient lock which absolutely prevents the coupling heads from loosening or becoming disconnected relative to each other. In the now preferred form, illustrated in Figs. 1 through 6, the present invention provides a housing 28 including a pair of front lugs 29 and a pair of rear lugs 30 having recesses 31 and 32 respectively for the reception and retention of a cover plate 33, the purpose of the latter being described shortly. The lugs 29 and 30 are preferably made integral with the main body 17 for economy in manufacturing costs. Other cooperating lugs 34 and a wedge 35 are also made integral with the main body but are spaced relative to the lugs 30 and 29 in a manner to provide a channel 36 and 38 capable of receiving a novel form of an expansible sliding member 37 in a manner to limit its sliding movement in the channel in two directions.

After the key 37 is placed in the channels 36 and 38 the cover plate 33 is placed thereover with the notches 46 just clearing the lugs 30 and then by sliding the cover in the direction of the arrow "a" (see Fig. 3) the plate moves into the slots 31 and 32 into the full operative position shown in Fig. 1, whereupon a screw 47 may be passed through a hole 48 in the plate and secured in a threaded hole 49 in the wedge lug 35.

The sliding member 37 in this present preferred form is somewhat in the shape of a cotter, but is preferably made of substantially flat strip stock instead of the customary semi-circular material. Recesses 39 are provided in the side walls 40 of the member, these recesses being adapted to clear the points 34' of the lugs 34 when the sliding member is pressed in the channel 38, and are of sufficient length to limit movement of the member in a direction toward the operative position shown in Fig. 1, and to limit retracted movement thereof to the inoperative position shown in Fig. 3.

This retracted movement is further limited by stop lugs 41 on the member 37 adapted to engage the front edge 42 of the cover plate 33. Each key is provided with a set of fingers 41a and 41b having a V-notch 43 therebetween, and having a slight bevel 44 on the underside thereof. The V-notch 43 is more acute than the shape of the wedge 35 so that the inner walls of the fingers 41a and 41b grip the wedge and so that the wedge expands or spreads these fingers as the sliding member is moved from the retracted position shown in Fig. 3 to the advanced position shown in Fig. 1. The recesses 39 in the member 37, in addition to limiting travel thereof, make it more flexible to facilitate the action of the wedge 35 spreading the fingers 41a and 41b.

Now it should be particularly noted that as the fingers 41a and 41b are spread between wedge 35 there is a movement of the walls of the recess 39 toward the points 34' into bighting engagement so that these points 34' grip the flexed member and prevent its retraction.

As the sliding member 37 is driven from the retracted position shown in Fig. 3 toward the adjacent connecting arm 24, by striking it with a hammer or the like in the direction of the arrow "a" shown in Fig. 3, so that the bevel 44 engages a cooperating bevel 50 on the arm and effects a similar pivotal movement of the heads 16 relative to each other in order to tightly bring the gaskets 21 face to face, and in its final movement wedges between these two gaskets tightly together since the cover plate prevents it from moving upwardly and away from the main body 17.

Thus, there is a quadruple lock effected when the sliding member is moved into this, the operative position; viz., between the point 34' and bottom wall of the recesses 39; between the fingers 41a and 41b engaging the wedge 35; between the member and the cover plate 33 as the bevel 44 rides up in the bevel 50; and between outer side walls of the fingers 41a and 41b engaging the points 51 of the lugs 29. To facilitate the latter, the wedge 35 is provided with a bevel 35', best seen in Fig. 11 which allows the outer free ends of these fingers to move toward each other and also permit greater variations in the thickness of the fingers than would be possible without the space provided by the bevel 35'.

Movement of the member 37 forwardly into the operative position is usually stopped by the bevel 44 riding up on the connecting arm bevel 50. However, the point 34' engaging the end of the recess 39, as it nearly does in Fig. 1, also serves this purpose. As the expansible sliding member is moved toward the operative position the wedge 35 moves deeper into the member and tends to both move the bottom walls of the recess tighter against the points 34' and spread the fingers 41a and 41b tighter against the points 51 of the lugs 29. Thus, the sliding member is more securely held in the important operative position than it is in the inoperative position. The two fingers 41a and 41b engaging the bevel 50 minimize the possibility of vibrations adversely loosening the slide 37 and in effect form a desirable double lock at the heavy load point.

In order to open the lock and coupling again it is merely necessary to strike the member 37 as at 41 whereupon the bevels 44 slide off the connecting arm bevels 50 and back until the lugs 41 engage the plate 33, or the points 34' engage the ends of the recesses 39 to limit movement of the member into retracted position. The V notch 43 and wedge 35 frictionally hold member 37 retracted.

In passing it should be noted that the arm 24, the associated connecting lugs 25, 26, and 27, and the bevel 50 are substantially similar to that in use currently on most railways, but with a different type lock, so that the coupling head 16 or 16' with the advantageous lock of the present invention may be put into use without changing over an entire railway system since one of the coupling heads of the present invention will fit and properly lock existing coupler heads with other forms of locks.

In Fig. 7 there is shown a modified form of the present invention which includes a coupling 55 of the so called transverse port type rather than the longitudinal or axial type illustrated with the first form of the invention. However, it should be understood that the novel locks provided by the present invention are equally applicable with both transverse and longitudinal types of couplings. This modified form of the invention includes mating coupling heads 56 and 56', which are a counter-part of each other, and have connections 57 to any desirable medium. These heads each have a main body 58 with an integral bore 59 and with ends 60, supporting gaskets 61 of any of the now well known types. These heads 56 and 56' and the gaskets 61 carried thereby are brought into face to face contact with a connection similar to the connections 25, 26, and 27 of the first form of the invention, or any of the other connecting mediums now well known in this art. A housing 63 is provided on each of the main bodies 58, and in its present preferred form comprises a set of front lugs 64 and rear lugs 65 having external recesses 66 and 67 respectively, and having intermediate lug 68.

This housing supports a substantially solid U-shaped sliding member 69 having a shank 70 and fingers 71 and 71', rather than the substantially expansible member 37 of the first form of the invention. This sliding member is provided with a U-shaped cut-out 72 adapted to just clear the intermediate lug 68. The intermediate lug 68 and the adjacent walls of the lugs 64 form a channel 38' to direct and support the U-shaped fingers 71 and 71', while at the same time, the inside walls of the lugs 65 form a complementary channel 36' adapted to receive and guide the shank 70 of the member 69 in its travel.

A bottom wall 73 of U-shaped slot 72 engages the intermediate lug 68 to limit movement of the key toward its operative position, and shoulders 74 at the point where the fingers 71 and 71' and shank 70 meet may engage the adjacent walls of the lugs 65 to limit movement of the member into the retracted or inoperative position. Auxiliary lugs 75 on the tops of the fingers 71 and 71' also serve to limit the retracting movement of the sliding member 69 by engaging with the front edge 76 of a modified form of cover plate 77.

This modified form of cover plate 77 is provided with downturned and curled-in ears 78 and 79 adapted to slide into recesses 66 and 67 of the lugs 64 and 65, and is provided with small fingers 80 and 81 adapted to be knocked down after the cover has been slid into the recesses into a plane below the recesses and into a position to engage the sides of the lugs 64 and 65 respectively rather than to slide through, thereby locking the cover plate in place. The shank has a slot 70a to yieldingly grip the channel 38a. Thus, the yielding shank of this form of sliding member 69 by its integral yielding structure, like the sliding member 37 of the first form of the invention, is yieldingly maintained in retracted or advanced position. This feature makes for a safer coupler as the trainman need not manipulate, push, or hold back parts to couple heads.

Operation of this form of the device consists merely in connecting a pair of coupling heads together and then simply striking the head 70' of the shank 70 to drive the sliding member 69 forwardly in the channel 36' and 38' until bevels 82 on the underside thereof, engaging and riding over cooperating bevels 83 on connecting arms 84 of the heads 56 and 56', tend to cam the two heads together, to lock them in the connected condition.

In order to unlock the coupling it is merely necessary to stirke the member 69 at the forward end of the fingers 71 or 71' or upon the lugs 75, whereupon the bevel 82 rides off the bevel 83 and the member 69 is moved back to the retracted position with the walls 74 thereof engaging the lugs 64. In this retracted position the fingers are entirely clear of the projecting arm 84 so that the two coupler heads may be rotated and disconnected relative to each other.

Thus it will be seen that the present invention provides a coupler which may be very tight, and thereby prevent the leakage of air, vapor, steam, or the like for economy, increased efficiency, and for convenience which has the advantage of thoroughly locking mating coupling heads relative to each other with a minimum of effort.

In some instances it may be found desirable to replace current type locks on couplings already in use with the improved lock of the present invention. To this end the present invention provides a modification in which the lock may be made as a unit 90 with a base 91 adapted to be secured to a planed off section of a regular coupler as by screws through holes 92, by welding, or by cover plate holding screws 87 passing through the base 91 and threading into suitable tapped holes in the coupler head.

This unit may be an exact counter-part of that form of the invention described in detail hereinbefore so far as the lugs, channels, sliding members, cover plates are concerned, excepting for the added provision of an underlying plate similar to the plate 91' of the base 91 shown in Fig. 11 and fastened to the coupler heads in the same manner as the latter, as will be readily understood by anyone familiar with this art.

As shown, the unit 90 in Fig. 11 is a counterpart of the first form of the invention. The same sliding member 37 and wedge 35 are used. The same lugs 29, 30, 34, and 34' are used, but in this form the lugs are supported by the plate 91' rather than made integral with the coupler head, and are of shorter height and flattened rather than recessed at the top to provide a flat support for plain cover plate 85 having holes 86 to receive holding screws 87 which may be threaded into tapped holes 88.

Although a sliding member 37 or 69 is provided on each coupling head, it will be understood that only one alone on a pair of mating coupling heads forms an effective lock.

Also, though several bighting or gripping points are illustrated and described in connection with the first and third forms of the invention, it is not necessary to use all of these in the one coupling, and even though two bevels are illustrated and described where the real locking takes place, it will be readily understood by those skilled in the art that one bevel rather than two, or in some cases no bevel at all, will also serve, dependent upon particular requirements of the individual coupler.

If preferred, the lugs 29, 30, 34, and 34' may be in the form of pins inserted into the coupling head, as will be understood readily by anyone skilled in the art. However, for economy, they are cast integral therewith.

Other modifications may be made within the scope of this invention, and portions of the improvements may be used without others.

I claim:

1. A coupling head comprising a body having a main connection and a projecting arm, adapted to be connected to a mating coupling head with a projecting arm; and a one-piece reciprocating and expanding locking member on said head having retracted and advanced positions, adapted to overlie the projecting arm on the mating head and lock the heads relative to each other.

2. A coupling head comprising a body having a main connection adapted to receive a mating coupling head; a housing on said body having a channel; and a one-piece expansible sliding member confined for reciprocatory movement in the channel of said housing, and adapted to be moved over the mating coupling head.

3. A coupling head comprising a body adapted to receive a mating coupling head; a housing on said body; an expansible sliding member in said housing; and a wedge adapted to spread said expansible sliding member in its movement from a retracted position into an advanced or operative position relative to the mating coupling head.

4. A coupling head comprising a body adapted to receive a mating coupling head; a housing on said body; an expansible sliding member in said housing; side walls on said sliding member; a set of lugs in said housing adjacent the side walls of the expansible sliding member; and a wedge adapted to spread said expansible sliding member and to move the side walls thereof into bighting engagement with the lugs in its movement from a retracted position into an advanced operative position relative to the mating coupling head.

5. A coupling head comprising a body adapted to receive a mating coupling head; a housing on said body; an expansible sliding member in said housing; a set of lugs in said housing adjacent the side walls of the expansible sliding member; a second set of lugs in said housing; and a wedge adapted to spread said expansible slide and to move the side walls thereof into bighting engagement with both the first and second set of lugs in its movement from a retracted position into an advanced operative position relative to the mating coupling head.

6. A coupling head comprising a body adapted to receive a mating coupling head; a housing on said body; an expansible member in said housing, having recessed side walls; a set of lugs extending into said recessed side walls and adapted to limit movement of said expansible member into retracted and/or advanced positions relative to the mating coupling head.

7. A coupling head comprising a body having a main connection adapted to receive a mating coupling head; a housing on said body; an expansible sliding member in said housing having advanced and retracted positions; and lugs on said expansible sliding member adapted to limit its movement into retracted position.

8. A coupling head comprising a body adapted to receive a mating coupling head; a housing on said body having a channel with an open top; a one-piece expansible sliding member confined for reciprocatory movement in the channel of said housing and placed thereon through the open top; and a cover plate for the channel of said housing adapted to close the open top.

9. A coupling head comprising a body adapted to receive a mating coupling head; a housing in said body having recesses; a one-piece expansible and reciprocatory sliding member in said housing adapted to lock the coupling heads relative to each other; and a cover plate for said housing adapted to engage with the recesses to hold the sliding member in the housing.

10. A coupling head comprising a body adapted to receive a mating coupling head; a housing on said body having recesses; a one piece expansible and reciprocatory sliding member in said housing adapted to lock the coupling heads relative to each other; a cover plate for said housing adapted to engage with said recesses; and a single screw engaging with said cover plate and adapted, with said recesses, to hold the cover plate against movement in all directions.

11. A coupling head comprising a body adapted to receive a mating coupling head; a housing on said body, and having recesses; a sliding member in said housing adapted to lock the coupling heads relative to each other; a cover plate sliding into the recesses of the housing; and ears on said cover plate adapted to cooperate with the housing to hold the cover plate in the recesses of the housing.

12. In a coupling the combination of a pair of mating coupling heads; a main connection between said coupling heads; a projecting arm on each of said heads; and a one-piece resilient and reciprocable member on at least one of said heads adapted to override the projecting arm of the other head, yieldable laterally and not vertically relative to the projecting arm, to lock the main connection and to lock the heads relative to each other.

13. In a coupling the combination of a pair of mating coupling heads; a main connection between said coupling heads; a one-piece resilient and reciprocable member on one of said heads; a beveled end on said member; a beveled wall on the mating coupling head adjacent the resilient sliding member and adapted to cooperate with the beveled end of the sliding member to move the heads relative to each other about the main connection.

14. In a coupling the combination of a pair of coupling heads; a connection between said coupling heads; a unitary one-piece expansible and reciprocable sliding member adapted to lock the heads relative to each other while in its expanded condition; and means on the coupling for supporting said sliding member.

15. In a coupling the combination of a pair of coupling members; an eccentric wedging connection between said members; a projecting arm on each of said heads; and a one piece expansible sliding member on one of said heads adapted to reciprocate and override the projecting arm of the other member to operate the wedging connection and to lock the heads relative to each other.

16. In a coupling head the combination of a body, adapted to receive a mating coupling head; a one piece reciprocable and expansible sliding member; a housing adapted to locate and support said sliding member for reciprocation; and lugs in said housing adapted to limit reciprocating movement of the sliding member into retracted and advanced positions relative to the mating coupling head.

17. In a coupling head the combination of a body, adapted to receive a mating coupling head; a substantially solid sliding member having a recess and a shoulder; a housing adapted to locate and support the substantially solid sliding member; and lugs in said housing adapted to engage said shoulder and the bottom of said recess of the sliding member to limit its movement into advanced and retracted positions relative to the mating coupling head.

18. A locking unit for a coupling head comprising a housing having a channel; a unitary expansible slide in said channel; means for holding said expansible slide in both a retracted and an advanced position; and a base in said unit for connecting it to a coupling head.

19. In a coupling head the combination of a body adapted to receive a mating coupling head; a solid sliding member having a U-shaped recess, and movable in two directions; a housing adapted to receive the solid sliding member; a lug in said housing adapted to engage the bottom of said recess to limit movement of the member in one direction; and lugs on the sliding member adapted to limit its movement in the other direction.

20. In a coupling head the combination of a body, adapted to receive a mating coupling head; a housing on said body; a reciprocating sliding member in said housing having retracted and advanced position relative to the mating coupling head; and integral resilient means on the slide for resiliently holding said slide in both the retracted and the advanced position.

21. A coupling head comprising a body having a main connection and a projecting arm, adapted to be connected to a mating coupling head with a projecting arm; a reciprocating sliding member on at least one of said heads and having advanced and retracted positions relative to the projecting arm on the mating head; and integral sections on the sliding member and forming a part thereof adapted to cooperate with the head upon which the sliding member is mounted and to hold the member in its retracted position.

22. A coupling head comprising a body having a main connection adapted to receive a mating coupling head; a housing on said body; a one-piece sliding member reciprocable in said housing adapted to be moved over the mating coupling head; and an integral expanding section on the sliding member cooperating with the housing to hold the sliding member in a retracted position.

23. A coupling head comprising a body having a main connection and a projecting arm, adapted to be connected to a mating coupling head with a projecting arm; a reciprocable sliding member on at least one of said heads and having advanced and retracted positions relative to the projecting arm on the mating head; and an integral yielding section on the sliding member and forming a part thereof adapted to cooperate with the head upon which the sliding member is mounted and to hold the reciprocable sliding member in its retracted position.

24. A coupling head comprising a body having a main connection adapted to receive a mating coupling head; a one-piece locking member reciprocable in said body and adapted to be moved over the mating coupling head; and an integral yielding section on the one-piece reciprocable locking member cooperating with the body to hold the sliding member in a retracted position.

25. A coupling head comprising a body having a main connection and a projecting arm, adapted to be connected to a mating coupling head with a projecting arm; a one-piece reciprocating and expanding locking member on said head having retracted and advanced positions, adapted to overlie the projecting arm on the mating head and lock the heads relative to each other; and means for expanding said member as it is moved from one to the other of said positions.

26. A coupling head comprising a body having a main connection and a projecting arm, adapted to be connected to a mating coupling head with a projecting arm; a one-piece reciprocating and expanding locking member on said head having retracted and advanced positions, adapted to overlie the projecting arm on the mating head and lock the heads relative to each other; and means for locking said member as it is moved.

GEORGE T. COOKE.